United States Patent [19]
Liljeholm

[11] Patent Number: 5,813,074
[45] Date of Patent: Sep. 29, 1998

[54] APPARATUS FOR CLEANING THE HEADS OF WELDING ROBOTS

[76] Inventor: Christer Liljeholm, P.O. Box 16, S-733 21 Sala, Sweden

[21] Appl. No.: 750,476

[22] PCT Filed: Jun. 15, 1995

[86] PCT No.: PCT/SE95/00732

§ 371 Date: Dec. 17, 1996

§ 102(e) Date: Dec. 17, 1996

[87] PCT Pub. No.: WO95/35182

PCT Pub. Date: Dec. 28, 1995

[30] Foreign Application Priority Data

Jun. 17, 1994 [SE] Sweden ................................. 9402134

[51] Int. Cl.$^6$ ...................................................... B08B 3/12
[52] U.S. Cl. .............................. 15/21.1; 15/93.1; 134/1; 134/184; 366/114; 366/314
[58] Field of Search ................... 15/21.1, 93.1; 134/1, 184; 366/114, 115, 314

[56] References Cited

U.S. PATENT DOCUMENTS 2,987,068  6/1961  Branson ................... 134/184
4,082,565  4/1978  Sjölander ................... 134/1

FOREIGN PATENT DOCUMENTS 1064779   9/1959   Germany .
1963163   6/1971   Germany .
 269282   6/1989   Germany ................... 134/1
5-317820  12/1993  Japan ................... 134/1
 648220   3/1985   Switzerland ................... 134/1

*Primary Examiner*—Mark Spisich
*Attorney, Agent, or Firm*—Alfred J. Mangels

[57] ABSTRACT

Apparatus for cleaning the heads of electrical welding robots, the heads including a gas casing and an electrical contact nozzle. The apparatus includes an open vessel which has connected thereto one or more ultrasonic generators which function to generate ultrasonic waves in a liquid contained in the vessel. The vessel has mounted therein a rotary device which is located beneath the upper surface of the liquid. The rotary device operates as a mode stirrer to help loosen rings of weld material that have been deposited at the gas casing outlet. Additionally, wire brushes and cutting tools can be provided on the rotary device and rotationally driven to assist in weld material removal from the casing outlet.

9 Claims, 2 Drawing Sheets

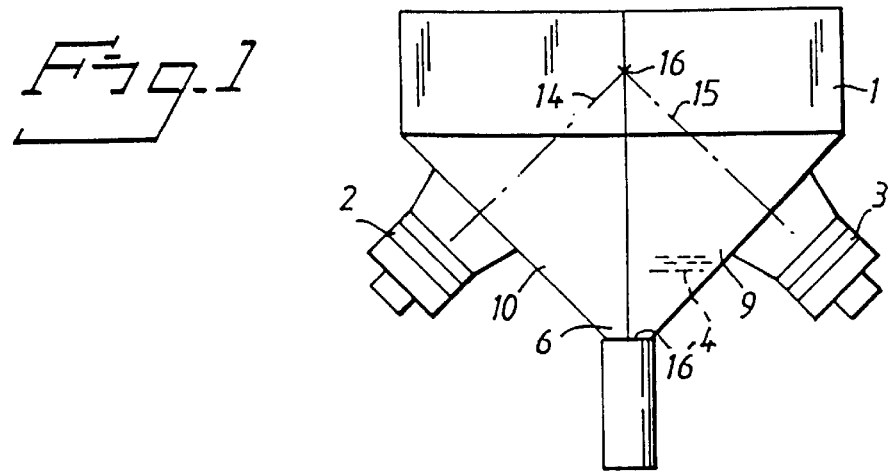
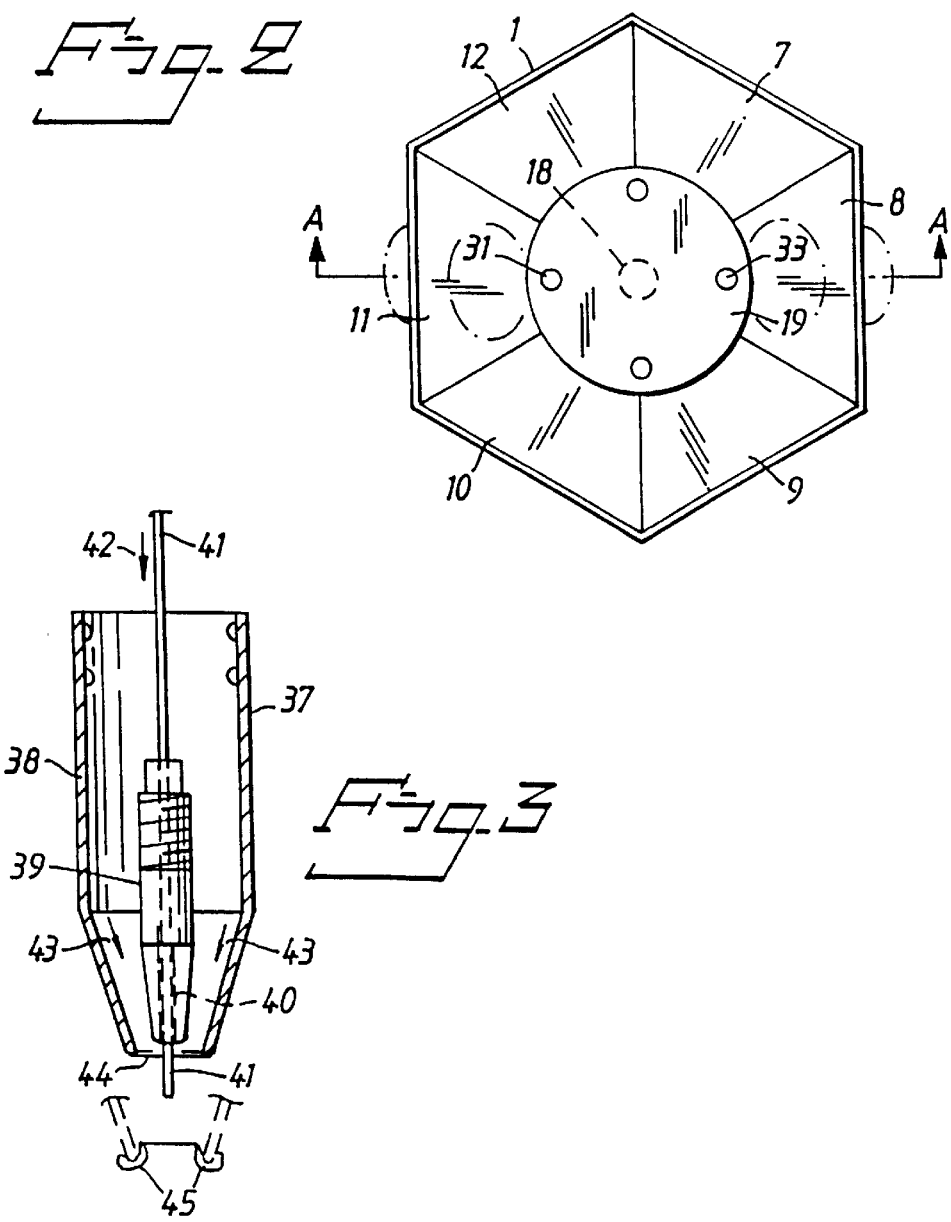

APPARATUS FOR CLEANING THE HEADS OF WELDING ROBOTS

BACKGROUND OF THE INVENTION

1. Field of the Invention

The present invention relates to an apparatus for cleaning the heads of welding robots.

2. Description of the Related Art

Welding robots are used generally within the workshop industry. This applies primarily to MIG-welding and MAG-welding A welding robot is programed to follow a certain pattern of movements, i.e. the robot head is arranged to follow a given pattern of movements. A workpiece to be welded by the robot is positioned accurately in relation to the robot, such that the workpiece will be located in a predetermined position in relation to the robot. As the robot head moves through the predetermined movement pattern, it will move in a predetermined manner in relation to the workpiece.

In welding operations, the robot head carries a welding head. The robot is thus able to move the welding head to those locations and along those edges or corresponding surfaces where welding is to be performed.

A welding head includes a gas casing which includes a central passageway for the delivery of welding gas. The gas is an inert gas and is ejected onto the weld location to prevent oxidation of the melt and also oxidation of those parts of the workpieces that are heated to high temperatures in the welding process.

The gas casing passageway has a funnel-shaped orifice. An electrical contact nozzle is provided in the gas-casing passageway and has a central channel through which welding rod is advanced to the welding location. The forward end of the nozzle terminates short of the orifice of the gas casing opening and is concentric therewith. The nozzle is connected to one terminal of the welding unit voltage source and the workpiece is connected to the other terminal of said source.

Splashes of weld material and slag, so-called weld spray, occur during a welding operation, these splashes landing on the weld head and therewith to a great extent on the edge surfaces defining the gas-casing opening, because the edge surfaces are located close to the workpieces during a welding operation. These splashes result in the build-up of rings of material around and in the opening on the weld head. The weld head and the nozzle also include soot from the fumes generated in the welding process.

The rings of weld-spray that build-up on the welding head and said edge surfaces are electrically conductive and result in spark-over between the rings and the workpieces, whereas the intention is for spark-over to take place between the weld electrode and the workpieces. This results in welding interruptions. The weldspray buildup may also prevent sufficient gas from being delivered to the weld location through the gas casing, resulting in a poor quality weld.

The above-identified weld-spray ring is built-up to an unacceptable size typically in from five to tan minutes, meaning that the gas casing must be cleaned relatively often.

At present, the gas casing is cleaned by placing the gas-casing opening on a milling tool and milling away the weldspray ring mechanically. The ring is often seated very firmly on the gas casing and removal of the ring results in the removal of material from the gas casing by virtue of the ring loosening from the casing and being whirled around in contact with the casing by the milling tool, therewith causing wear to the casing. The task of removing the ring with the aid of other hand-operated tools, such as cutting nippers, for instance, is also time-consuming. The interior of the gas casing and the electrical contact nozzle are cleaned with the aid of compressed air, although the result is not always satisfactory.

The welding equipment may also include watercooled gas casings, which are provided with internal cooling channels. Repeated cleaning of the gas casings with subsequent removal of material therefrom may result in the removal of so such material as to open the cooling channels so that the water conducted therethrough will spray out. This results in interruptions in the welding operation.

In view of the fact that gas casings are relatively expensive and that the casings must be cleaned very often, it is highly desirable for the casings to be cleaned in a manner which is lass harsh on the casings and which will enable the casings to be cleaned much more quickly. It is also desirable to be able to clean the inside of the gas casing and the electrical contract nozzle quickly and simply.

The present invention satisfies these desiderata and provides an apparatus for cleaning the gas casing and the electrical contact nozzle quickly and with such less wear on the casing in the proximity of its opening than that experienced with conventional cleaning processes.

SUMMARY OF THE INVENTION

The present invention thus relates to an apparatus for cleaning the heads of electrical welding robots, said heads including a gas casing and an electrical contact nozzle, wherein the apparatus includes an open vessel having connected thereto one or more ultrasonic generators which function to generate ultrasonic waves in a liquid contained in the vessel; and in that a rotary device in mounted in the vessel with said device located beneath the upper surface level of the liquid.

BRIEF DESCRIPTION OF THE DRAWINGS

The invention will now be described in more detail, partly with reference to exemplifying embodiments of the invention and also with reference to the accompanying drawings, in which FIG. 1 is a side view of part of an apparatus in accordance with the present invention;

FIG. 2 illustrates the apparatus of FIG. 1 from above;

FIG. 3 illustrates schematically a gas casing and an associated electrical contact nozzle, said casing being shown in section;

DESCRIPTION OF THE PREFERRED EMBODIMENTS

Figure 4:
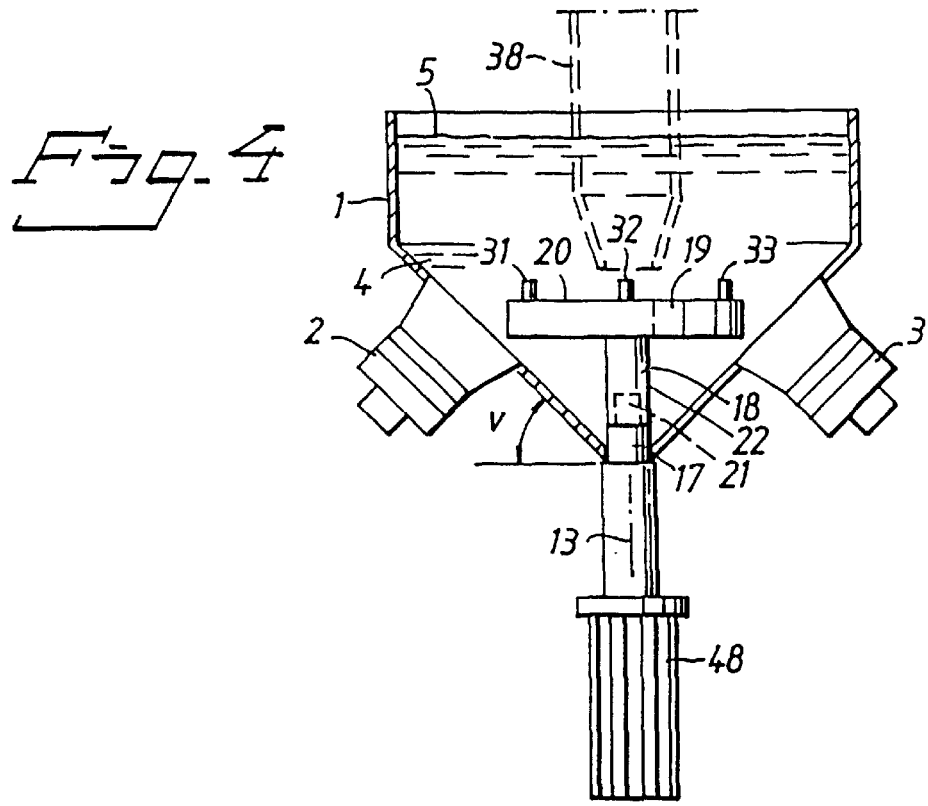
FIG. 4 in a side view of the apparatus of FIG. 1 and shown a vessel belonging to said apparatus in section, taken on the line A—A in FIG. 2.

FIGS. 1, 2 and 4 illustrate an apparatus for cleaning the heads of electrical welding robots, said heads including a gas casing and an electrical contact nozzle.

In accordance with the invention, the apparatus includes an open vessel 1 which has connected thereto one or more ultrasonic generators 2, 3 for generating ultrasonic waves in a liquid 4 present in the vessel 1. The ultrasonic generators are of a conventional kind and of the type used to generate ultrasonic waves it a liquid for cleaning purposes, in a known manner. The vessel 1 is preferably made of stainless steel. According to the invention, there is mounted in the vessel a rotary device which is located beneath the upper surface level of the liquid. This surface level is shown by the undulating line 5 in FIG. 4.

The rotary device functions to stir the modes, i.e. standing waves are disturbed in the liquid. This has been found to provide a markedly improved cleaning affect.

According to one preferred embodiment of the invention, the vessel 1 is conical in shape with the cone apex 6 facing downwards. The outer mantle surface or the cone is provided with a plurality of flat sidepieces 7–12. An ultrasound generator 2, 3 is mounted on each of three or more of the flat sidepieces 7–12, to generate ultrasonic waves in the liquid.

According to one preferred embodiment, the vessel 1 includes six sidepieces with an ultrasonic generator placed on each alternate sidepiece, i.e. an embodiment which includes a total or three generators.

The side surfaces define an angle v (see FIG. 4) with a plane which extends perpendicular to the longitudinal axis 13 of the vessel and the ultrasonic generators are so positioned on respective side surfaces that respective normals 14, 15 (see FIG. 1) of said side surfaces extending from respective ultrasonic generators will coincide with a point 16 on the longitudinal axis of the vessel 1 beneath the surface 5 of the liquid. As a result, strong interference taken place between the ultrasonic waves at the point 16.

A shaft 17 extends through a penetrating hole 16' in the bottom of the vessel 1 and carries a tool attachment device 18 on the end thereof located in the vessel. An electric motor 48 which drives the shaft 17 is coupled to the other end of the shaft.

According to one preferred embodiment, the shaft 17 is rotated at a speed of 50 to 500 r.p.m., preferably about 180 r.p.m.

According to one preferred embodiment, the tool attachment device 18 has the form of a plate 19 which is positioned at right angles to the shaft 17 and the upper side 20 of which is provided with tool-mounting means.

The tool attachment device 18 is preferably fitted detachably to the shaft 17. According to one embodiment, the upper part 21 of the shaft 17 has a square cross-sectional shape, for instance. In this case, the attachment device 18 will include a sleeve 22 which projects down from the plate 19 and which has an internal hole of corresponding cross-section. When the sleeve 22 is fitted onto the upper part 21 of the shaft, the two parts will be in engagement for rotation of the tool.

The tool is comprised of one or more brushes and/or a milling tool. Examples of such tools are shown in FIGS. 5a–5c.

Figure 5A:
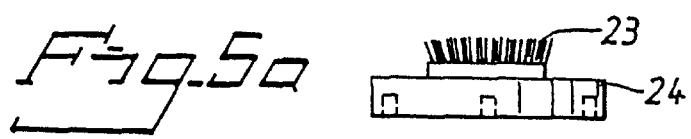
FIGS. 5a, 5b and 5c illustrate different tools.

FIG. 5a shows a steel-wire brush 23 fitted on a base plate 24.

Figure 5B:
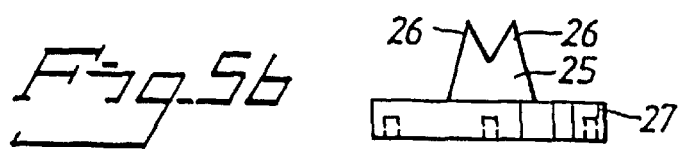

FIG. 5b shows a milling tool 25 having upstanding cutting edges 26. The outer side of the cutting edges is intended to abut the inside of a ring of weld spray adjacent the opening of a gas casing. The milling tool is mounted on a base plate 27. The milling tool may have a form which corresponds to the form typically used to clean-off rings of weld spray.

Figure 5C:
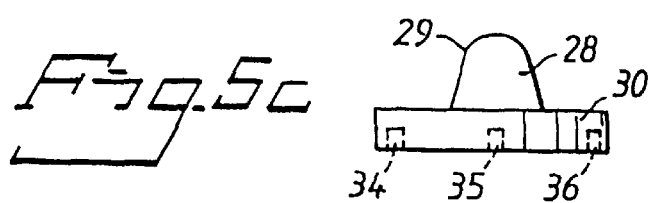

FIG. 5c shows another cutting tool 28 having an upwardly rounded cutting edge 29 which is intended to abut the ring of weld spray in the same way as the milling tool. This cutting tool is mounted on a base plate 30.

The tool base plates 24, 27, 30 are fitted to the plate 20 of the tool attachment device in a manner which will prevent rotation of the base plates on the plate 20. For instance, the plate 20 may be provided with a number of upstanding pegs 31–33 which are received in corresponding holes 34–36 in the base plates 24, 27, 30. Thus, when a tool in fitted to the attachment device 18, the tool will rotate as the shaft 17 rotates.

FIG. 3 illustrates schematically a conventional gas casing 37 fitted to a robot head. The casing includes a sleeve 38 and an electrical contact nozzle 39. The nozzle 39 is screwed onto a pipe (not shown) and when fitted takes the position shown in FIG. 3 relative to the sleeve 38. As mentioned before, the nozzle 34 has provided therein a channel 40 in which welding rod 41 in advanced. As the welding rod 41 is consumed, the rod is advanced down in the direction of the arrow 42. Inert gas flown down between the sleeve 38 and the nozzle 39 when welding is in process, as indicated by the arrows 43.

As mentioned in the introduction, welding spray will build-up a ring of material around the edges defining the gas casing opening 44. The lower part of the casing 37 in the vicinity of the casing opening 44 in shown at the bottom of FIG. 3 in broken lines. A ring 45 of material of the aforesaid kind is shown in full lines in a normally occurring size.

Obviously, the presence of such a ring 45 of materials will disturb the flow of gas from the gas casing 37, furthermore, such a ring will influence the location at which an electric spark-over takes place on the workpiece. It is, therefore, necessary to remove such rings.

The speed at which such a ring builds up will depend on how well the welding parameters, such as voltage, current strength, welding speed, etc., have been set. It may take from a few minutes to an hour for such a ring to build up. Each time a ring builds up, it in necessary to clean-off the ring in order not to impair the quality or the weld.

The present invention works in the following manner. When a gas casing 37 is to be cleaned, the robot is programmed to move the casing to a position corresponding to the position shown in broken lines, in FIG. 4, such that the forward part of the casing will be in contact with a tool 24, 27, 30 mounted for rotation with the plate 19.

The level 5 or the liquid 4 in the vessel in sufficiently high to allow at least the forward part of the casing 37 and the electrical contact nozzle 39 to be submersed in the liquid.

According to one preferred embodiment, the liquid is a washing detergent. The washing detergent may be any suitable detergent used for industrial purposes. One example of a suitable washing detergent is that sold by Leverindus, Nyköping, Sweden, under the trade designation ST 104. The washing effect can be enhanced with the aid of vessel-mounted immersion heaters (not shown), so as to maintain the liquid at an elevated temperature, for instance at a temperature of 60° C.

The ultrasonic generators are started up in conjunction with lowering the gas casing 39 into the vessel 1 of the inventive device. It has surprisingly been found that the ultrasonic waves cause the ring 45 to loosen from the casing 37 such that the ring will either fall off or can be easily removed from the casing. The ring is seated initially very firmly to the casing, which is one of the main problems encountered when cleaning gas casings with the aid of conventional methods. At times, the ring will simply fall from the casing when the casing is lowered down into the inventive apparatus, without needing to use a tool to this end. In this regard, it has been found that the provision of a rotary device in the vessel has a significant effect on the tendency of the ring to loosen, despite the rotary device not being in contact with the ring. It is assumed that the mode stirring affect of a rotary device is highly influential in this regard.

Figure 6:
FIG. 6 illustrates a rotary device.

One such rotary device is shown by way of example in FIG. 6, in the form of a U-shaped device 46 mounted on a base plate 47. The base plate 47 corresponds to the base plates 24, 27, 30. The device 46 is designed so as not to come into contact with the gas casing 37 when the casing is lowered into the vessel 1. Such a rotary device can be referred to as a mode stirrer.

It has been observed that the tendency of the ring 45 to loosen in particularly manifest when the ring passes the region of the point 16 (see FIG. 1), and consequently a construction which includes such a point is highly essential.

A rotary milling tool is used to split rings which are relatively large, wherewith after having been loosened from the gas casing 37, the ring 45 will split and fall therefrom. Naturally, the milling tool can also be used to cut away ring residues from around the gas-casing opening. The cutting tool shown in FIG. 5c is used in a corresponding manner.

A brush can be used to clean the forward part of the casing 37 in a gentler manner. The use of a brush will assume that the ring 45 has been loosened from the casing by the ultrasonic vibrations, so that when brushed the ring will fall from the casing without requiring the use of a milling or cutting tool.

It has been found that when applying the present invention, the ring 45 of weld spray material is easily removed and that both the gas casing and the electrical contact nozzle 39 are cleaned very effectively. Furthermore, the time taken to clean the casing and the nozzle is only about ten seconds. The problems mentioned in the introduction are, therefore, eliminated by means of the present invention. Because of the short cleaning time afforded by the invention, the robot can be programed to perform gas casing cleaning operations at very short intervals, so am to prevent the build-up of thick rings. This enables welding to be performed with gas casings which are practically always clean, therewith considerably improving the average weld quality.

Although the invention has been described with reference to a number of exemplifying embodiments thereof, it will be understood that both the construction of the vessel and the number of ultrasonic generators used and the design of the tools can be varied and modified by those skilled in this art.

The present invention shall not, therefore, be considered to be limited to the aforedescribed embodiments, since variations and modifications can be made within the scope of the following claims.

What is claimed is:

1. Apparatus for cleaning the heads of electrical welding robots, wherein the heads include a gas casing and an electrical contact nozzle, said apparatus comprising: an open vessel having a longitudinal axis and which includes means for generating ultrasonic waves in a liquid contained in the vessel, a rotary device within the vessel and located beneath an upper surface of the liquid, wherein the vessel is conical in shape and includes a cone apex that faces downwards and is defined by a plurality of flat sidepieces, wherein the means for generating ultrasonic waves include an ultrasonic generator mounted on each of at least three of the flat sidepieces for generating ultrasonic waves in said liquid; and wherein normals extending inwardly from each respective ultrasonic generator coincide at a point on the longitudinal axis of the vessel located beneath the upper surface of said liquid.

2. Apparatus according to claim 1, wherein the liquid level in the vessel is at an elevation such that at least a forward part of the gas casing and the electrical contact nozzle are immersed in the liquid.

3. Apparatus according to claim 1, wherein the vessel includes a through-penetrating hole for receiving a shaft, wherein an end of the shaft positioned within the vessel carries a tool attachment device for mounting tools for engaging the gas casing, and wherein an opposite end of the shaft is coupled to an electric motor for rotation of the shaft.

4. Apparatus according to claim 3, wherein the shaft rotates at a speed of from about 50 to about 500 r.p.m.

5. Apparatus according to claim 3, wherein the tool attachment device includes a plate which is positioned at right angles to the shaft, wherein an upper side of the plate includes means for mounting a tool to the plate.

6. Apparatus according to claim 5, wherein the tool includes a brush.

7. Apparatus according to claim 1, wherein the liquid is a washing solution containing a detergent.

8. Apparatus according to claim 3, wherein the shaft rotates at a speed of about 180 r.p.m.

9. Apparatus according to claim 5, wherein the tool includes a milling tool.

* * * * *